Patented May 21, 1946

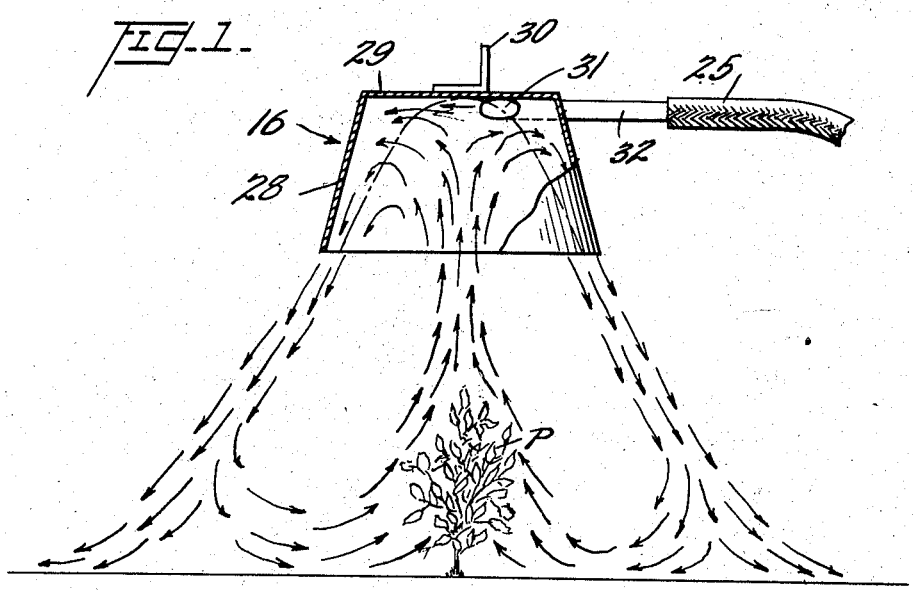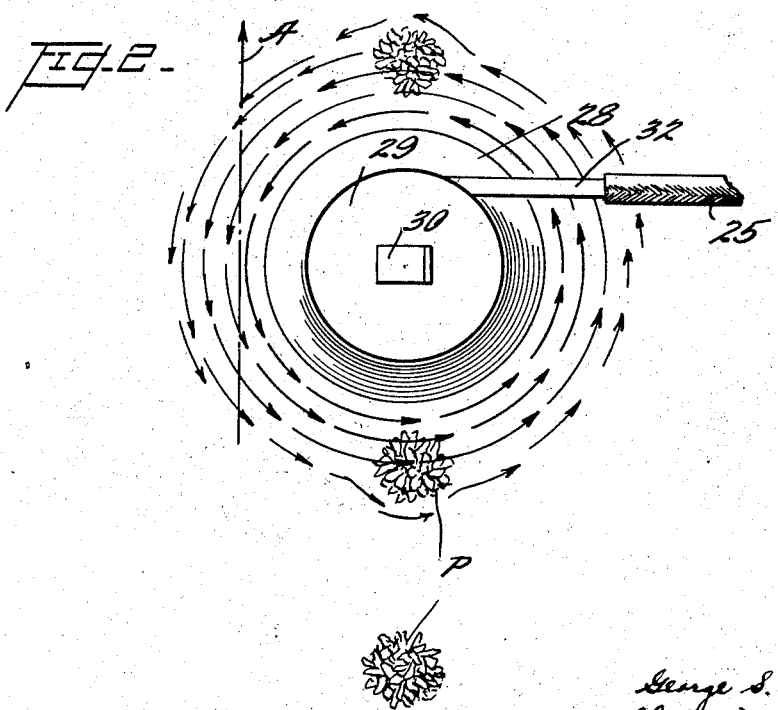

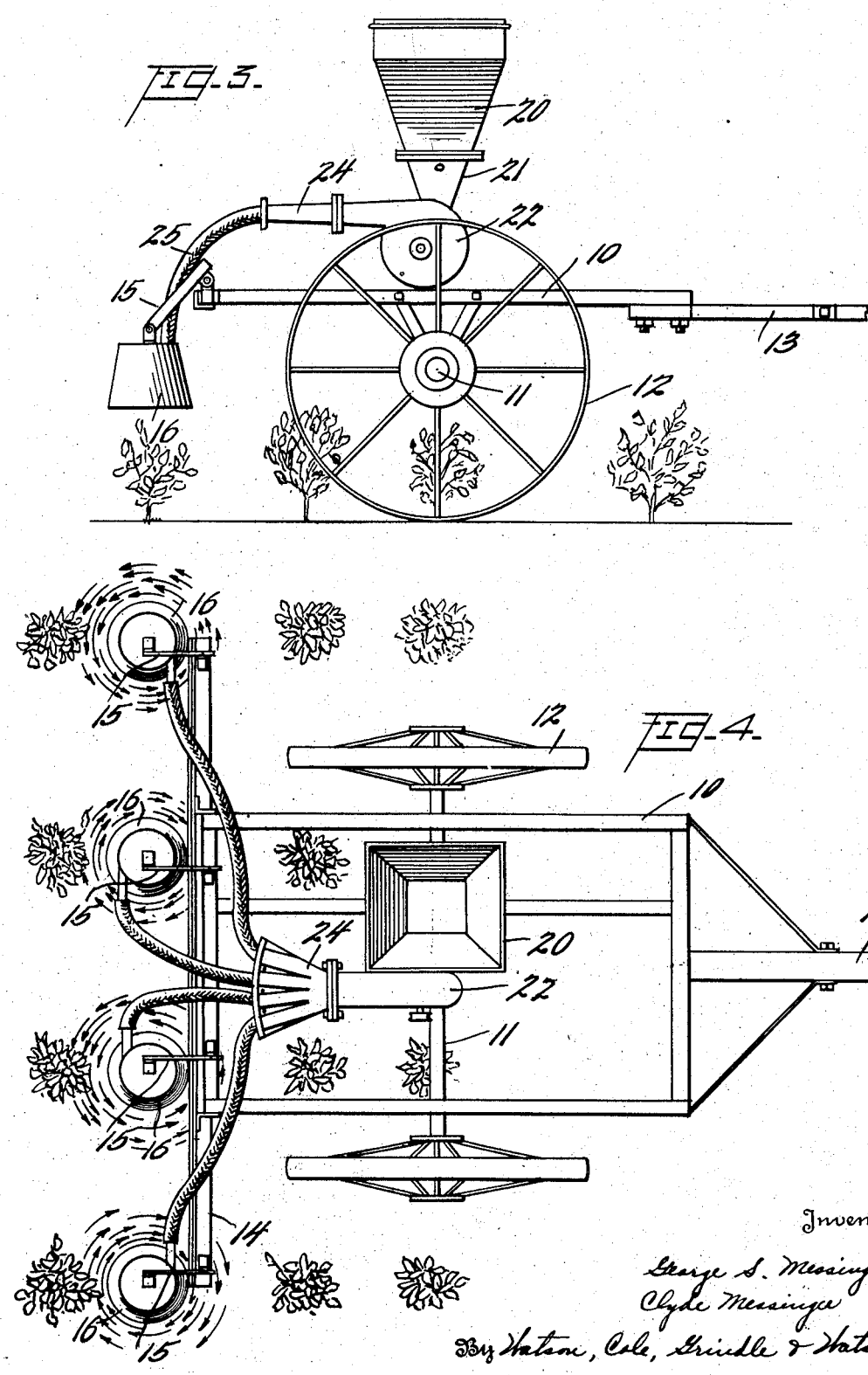

2,400,702

UNITED STATES PATENT OFFICE 2,400,702

METHOD OF AND APPARATUS FOR DUSTING PLANTS

George S. Messinger and Clyde Messinger, Tatamy, Pa., assignors to Messinger Manufacturing Company, Tatamy, Pa., a corporation of Pennsylvania Application May 19, 1941, Serial No. 394,184

7 Claims. (Cl. 43—148)

This invention relates to methods of and apparatus for applying to growing plants chemical materials in dust form for the purpose of destroying, or controlling the growth of, insects, fungus, or parasites of any nature, or for applying to plants growth stimulating or fertilizing dust.

Numerous types of apparatus primarily designed and intended to be used in the application of dust to growing plants have heretofore been designed and many such appliances have been used with satisfactory results. When dust is to be applied to many plants within a relatively short time, as when rows of plants in a field are to be dusted, the dust spraying mechanism is mounted upon a mobile support and the support is drawn along the rows of plants, the dust spraying apparatus passing over each successive plant. By means of nozzles of various kinds, jets of dust laden air are discharged onto successive plants, a plurality of nozzles being customarily arranged in a group, the nozzles of each such group being so disposed with relation to each other that the various surfaces of the leaves, stems and trunk of the plant are coated. In a dust spraying apparatus heretofore employed with success, three nozzles have been made use of, one positioned in such manner as to direct a jet of dust laden air vertically downwardly and the others being laterally disposed so as to direct jets of dust laden air downwardly and inwardly toward the plant to be dusted. While, as heretofore stated, apparatus of this character has been employed with a substantial measure of success in the dusting of plants, we have discovered that the application of dust to a plant or plants can be more satisfactorily and economically effected by the improved method and apparatus which comprises the subject-matter of the present invention. As those who are most familiar with the problems involved in the application of dust to growing plants are aware, it is essential that all areas of the plant be dusted if insect growth is to be effectively prevented or controlled. It is not necessary that the layer of dust be a heavy one, but it is essential that all areas of the leaves, stems and branches of the plant be dusted, and it has been found most difficult to obtain this highly desirable uniform application of dust by the use of any method or mechanism heretofore known. In the average case, dust is applied heavily to the upper and lateral surfaces of the plant being subjected to the dusting operation, but numerous areas of the downwardly facing surfaces of the leaves, stems and branches remain uncoated. It is a particular purpose of the present invention to provide a method of and means for applying dust to plants whereby all surfaces of each plant treated will be uniformly coated and particularly the undersurfaces of the leaves and branches, which are the most difficult surfaces to reach.

It is a further object of the invention to provide mechanism for the application of dust to growing plants which is simpler in its nature, more easily operated, and more economical to construct and use than any similar apparatus which has been up until this time proposed. Thus, in accordance with the present invention, a single nozzle for the distribution of dust over all of the leaves, stems and branches of a plant is substituted for the conventional group of several nozzles heretofore employed to less efficiently perform the same function. The improved nozzle is simpler and less costly to fabricate than those heretofore employed. The method of dusting contemplated involves the creation of a downwardly directed rotating envelope of dust laden air or other gas, this envelope having a diameter as large as, or preferably somewhat larger than, the diameter of the plant to be dusted and being projected against the ground around the plant. Within the rotating envelope and in the vicinity of the nozzle from which it emanates, a sub-atmospheric pressure exists and this causes certain of the gases of the envelope to be drawn inwardly along the ground level and thence upward centrally of the rotating envelope, passing through the branches and leaves of the plant to be dusted and causing each area of the under surface of the leaves and branches to be contacted by a rising stream of dust laden gas so that no such downwardly facing area of the plant is left without its proper dust coating.

In the dusting of a row of plants, the rotating envelope of dust laden gas is of course advanced horizontally along the row and, by reason of the fact that the current of dust laden gas is rotating about a substantially vertical axis, the opposite sides of the plant are subjected to the direct action of the dust laden gas alternately, one side being dusted before the center of the rotating envelope has reached the plant and the opposite side being dusted after the center of the gaseous envelope has passed over the plant. Thus, both prior to and after the time that the plant is encircled or enveloped by the gaseous current, is is subjected to the action of the current first on one side and then on the other, with the result that all surfaces are very effectively covered.

The apparatus may be so constructed that a plurality of parallel rows of plants may be simultaneously dusted and, when a plurality of revolving gaseous dust laden currents are employed, one for each row, each such current is caused to rotate in a direction opposite to that in which the adjacent currents rotate. Thus, where there are four such rotating bodies of dust laden gas, alternate gaseous currents are caused to rotate in a clockwise direction and intermediate gaseous currents in a counter-clockwise direction so that adjacent portions of adjacent gaseous currents will be moving in the same general direction. This prevents the formation of destructive eddy currents which might interfere with uniform application of dust to plants.

The invention may have various embodiments, one of which is illustrated in the accompanying drawings by way of example, this embodiment of the invention being an extremely simple form thereof. It will be appreciated, however, by one schooled in the art, that various forms of apparatus may be employed in the practice of the novel method described and that the apparatus which has been selected for disclosure is by way of illustration only.

In the drawings:

Figure 1 shows partially in side elevation and partially in section one of the improved nozzles, the flow of gases being indicated diagrammatically by vectors or arrows and the nozzle being shown to be positioned directly above a plant to which dust is being applied;

Figure 2 is a top plan view of one of the nozzles positioned over one plant of a row of plants, a rotating current of dust laden gas being likewise indicated by the arrows;

Figure 3 is a side elevation of a mobile unit for dusting, which unit includes nozzles of the type contemplated by the invention; and Figure 4 is a top plan view of the dusting unit shown in Figure 3.

In making practical use of the invention, it will, in the average case, be preferred to mount the nozzle by means of which the rotating envelope of dust laden gas may be created, on a mobile support. In the drawings, a wheeled support is illustrated and this may be of any desired design, comprising, for instance, a body or frame 10 mounted upon an axle 11 which is in turn supported upon wheels 12. A tongue 13 projects from the body 10 at one end and a transverse beam 14 is mounted upon the frame or body 10 at its rear end, the beam supporting the several nozzles. Thus, in the case of the apparatus shown, there are adjustably mounted upon beam 14, four equi-distantly spaced nozzle supports 15 to the lower end of each of which is suitably attached one of the dusting nozzles 16, hereinafter to be described in detail. Details of design of the supports 15 may be varied widely without departure from the invention, and it need only be said that these supports are preferably of the adjustable type, permitting vertical and horizontal adjustment of the associated nozzle 16.

Supported upon frame 10 by any suitable mounting and bracing means is a hopper 20 for the reception and storage of a substantial amount of dust to be used in a plant dusting operation. Below hopper 20 is a means, generally indicated at 21, for withdrawing from the larger body of dust relatively small amounts, the withdrawal being continuous so long as the vehicle is in motion. The dust thus separated is acted upon by a beater in a chamber through which a stream of air is constantly passing, being thereby evenly distributed throughout the air stream and removed from the beating chamber.

From the beating chamber, the dust laden stream of air passes into the centrifugal fan 22 which, as a matter of fact, induces the flow of air through the beating chamber. The fan delivers the stream of dust laden air to a distributor 24 which divides the single stream of dust laden air into a plurality of smaller streams, one for each nozzle, each outlet of the distributor 24 being connected to a nozzle 16 by means of a conduit which is preferably in the nature of a flexible tube such as indicated at 25. The mechanism just described for effecting the distribution of dust throughout a moving stream of air and causing the stream to move toward the nozzles, being divided into smaller streams on the way, may be designed and constructed in any satisfactory manner, but I prefer that the distributor 24 be constructed in accordance with the teachings of Patent 1,850,937, granted March 22, 1932, and that the apparatus for removing dust from the hopper and causing it to be distributed throughout and picked up by the stream of air be constructed in accordance with the teachings of Patent 1,716,970, of June 11, 1929, the devices disclosed in these prior patents having been found to be eminently satisfactory in operation, by test and long continued use.

One of the nozzles forming an essential feature of the present invention is illustrated in Figure 1 and it will be seen that this nozzle is of very simple construction comprising, in effect, a frusto-conical tubular member 28, preferably formed of sheet metal, its larger end being open but its smaller end being closed by a disc 29. Affixed to disc 29 is a bracket or other securing member 30 by means of which the nozzle may be readily attached to the suspending member 15. Preferably, for dusting small plants from 4 to 12 inches tall and from 4 to 12 inches in diameter, the frusto-conical portion 28 of the nozzle is 8 inches in depth (measured axially), 14 inches in diameter at its larger end, and 12 inches in diameter at its smaller end. An inlet port for a dust laden gas, such as air, is indicated at 31 and the duct or conduit for leading dust laden air to this inlet port 31 is indicated at 32.

Duct 32 is so disposed that the stream of dust laden air which passes through it into the interior of the nozzle will be discharged into the nozzle in a direction approximately tangential to the inner face of the nozzle, as clearly indicated in Figure 2. The axis of duct 32 is likewise approximately parallel to the plane of the nozzle end closure 29. With the nozzle as thus far described positioned over a plant indicated at P, and the jet of dust laden air passing into the nozzle at a high velocity, for instance, a velocity of 5000 feet per minute, a gaseous envelope will be formed around the plant, somewhat in the manner roughly indicated by the arrows in Figures 1 and 2. The inner wall surface of the nozzle will guide the incoming jet or current of air along a circular path, giving it a whirling motion and the rapidly moving air current will form a revolving continuous envelope or layer flowing along the inner surface of nozzle portion 28. Naturally, this frusto-conical gaseous envelope will be constantly forming anew at the upper end of the nozzle and will be constantly issuing from the lower end of the nozzle, as indicated in Figure 1, the whirling envelope maintaining its integrity to a large degree until it actually strikes the ground surface round the plant P.

In Figure 1, the various arrows indicate the vertical movements of the gases of the dust laden envelope and it will be seen that a considerable portion of the dust laden gas of the envelope passes inwardly toward the axis of the nozzle (prolonged), just above the ground surface, passing through the plant from below and thence upwardly toward and into the nozzle, finally passing laterally into the downwardly flowing stream of gas, as further indicated by the arrows. This inward and upward flow of a substantial portion of the gases projected from the nozzle is brought about by reason of the fact that a partial vacuum is formed centrally within the nozzle, due to centrifugal action, and when the velocity of flow of gas into the nozzle is at a relatively high rate, the pressure which exists within the nozzle along the axis thereof will be lower than it will be when the dust laden gas is projected into the nozzle at a lower rate, as will be apparent. By regulating the proportions of the nozzle, the inlet duct 32, and varying the velocity of the incoming dust laden gases, the pressure may be raised or lowered and the counter-flow or up draft increased or decreased, as may be desired. This regulation of the up draft may be effected where plants having different characteristics are to be dusted and one using the apparatus and practicing the method will have no difficulty in providing a nozzle which is especially suitable for the dusting of plants of different species, sizes and physical characteristics.

From an inspection of Figure 2, it will be perceived that, if the nozzle is advanced in the direction of arrow A along a row of plants P, each succeeding plant will first be subjected to a sweep of dust laden gas from one side, before the nozzle comes directly over it, will then be subjected to the complete action of the rotating gaseous current as the nozzle reaches a position directly over the plant, and will finally be subjected to a sweep of dust laden gas in a generally horizontal direction from the opposite side as the nozzle continues its progress in the direction of the arrow A. The gaseous dust laden current, therefore, reaches each and every portion of the plant and the nozzle functions with remarkable efficiency in applying a uniform coating of dust to every area of a plant subjected to its action.

When it is desired to make use of a plurality of nozzles and to dust two or more rows of plants at one time, the nozzles should be so constructed and so arranged on the mobile support that the rotating gaseous currents do not have a tendency to rub against each other while moving in opposite directions and to thereby create destructive eddy currents. On the contrary, it is highly desirable to so arrange and construct the nozzles that each dusting current rotates about its axis in a direction reversed with respect to the directions of rotation of the two gaseous currents next adjacent the same, such an arrangement of nozzles being shown in Figure 4. The movement of rotation of each of the several bodies of dust-laden air is, therefore, not impeded by frictional retardation due to contact of any portion of its periphery with that of a similar body rotating in the opposite direction.

Without departure from the invention, considerable changes may be made in the form of nozzle employed, particularly in applying the invention in the dusting of plants of widely different shapes and characteristics. The mobile support may be varied to suit conditions and likewise, as has previously been explained, the character of equipment for creating the dust laden stream may be somewhat modified, although that illustrated and disclosed in the patents referred to is to be preferred.

We claim:

1. A dusting apparatus comprising a plurality of laterally spaced nozzles, means for forcing a stream of dust laden air moving at high velocity into each of said nozzles each nozzle being adapted to receive such current and to form therefrom a current of dust laden air which rotates about an axis and progresses longitudinally of said axis, said nozzles being constructed and arranged so that the axes of their respective discharging currents are substantially parallel and each such current rotates immediately adjacent and in a direction opposed to that of the immediately adjacent rotating current or currents.

2. A mobile dusting apparatus comprising a mobile support, and means on said support for downwardly discharging rotating streams of dust laden air, said streams rotating in opposite directions about parallel axes and being so spaced relatively to each other that portions of adjacent streams will contact and move in the same direction.

3. The method of dusting a plant which comprises forming a downwardly directed current of dust laden air generally annular in horizontal section, and rotating such current about a substantially vertical axis while moving it horizontally to thereby subject the plant to the successive actions of gaseous currents moving in opposite directions.

4. The method of dusting a plant which comprises creating a sub-atmospheric pressure region directly above the plant and projecting a rotating gaseous current of dust laden air downwardly laterally of the plant thereby causing at least part of the dust laden air to move inwardly and upwardly about the plant and toward said region.

5. The method of dusting a plant which comprises creating a sub-atmospheric pressure region directly above the plant and projecting a rotating gaseous current of dust laden air downwardly on all sides of the plant thereby causing at least part of the dust laden air to move inwardly and upwardly about the plant and toward said region.

6. The method of dusting a plant which comprises forming a downwardly moving dust laden gaseous current which rotates about a vertical axis and within which a sub-atmospheric pressure obtains, and causing such downwardy moving gaseous current to envelop a plan and contact the surface of the ground around the plant, a portion of the rotating gaseous current reaching the ground level being drawn inwardly and upwardly into the zone of sub-atmospheric pressure to thereby effect the deposition of dust upon the undersides of the leaves and branches.

7. A dusting apparatus comprising a mobile support, and means mounted on said support and maintained thereby at a desired distance above the ground for directing downwardly against the ground surface a dust laden gaseous current which rotates about a vertical axis and within which a sub-atmospheric pressure obtains, said current being adapted to envelop a plant over which said means may be moved and to contact with the ground around such plant, a portion of the rotating gaseous current reaching the ground level being drawn inwardly and upwardly into the zone of sub-atmospheric pressure to thereby effect the deposition of dust upon the undersides of the leaves and branches of the plant.

GEORGE S. MESSINGER.
CLYDE MESSINGER.